(12) United States Patent
Kim

(10) Patent No.: US 6,519,412 B1
(45) Date of Patent: Feb. 11, 2003

(54) APPARATUS AND METHOD FOR CHANGING VIEWING RESTRICTION LEVEL IN A PARENTAL CONTROL SYSTEM FOR DIGITAL VERSATILE DISC PLAYER

(75) Inventor: Young-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/871,942

(22) Filed: Jun. 10, 1997

(30) Foreign Application Priority Data

Jun. 10, 1996 (KR) .......................... 96/20589

(51) Int. Cl.[7] ................................ H04N 5/91
(52) U.S. Cl. ...................... 386/94; 386/125; 713/183
(58) Field of Search ............... 386/1, 94, 52; 360/15; 380/3, 4, 5, 22; 348/7; 369/32, 44.29; 713/183; 705/52

(56) References Cited

U.S. PATENT DOCUMENTS

| | | | | |
|---|---|---|---|---|
| 5,434,678 A | * | 7/1995 | Abecassis | 366/52 |
| 5,629,733 A | * | 5/1997 | Youman et al. | 348/7 |
| 5,757,748 A | * | 5/1998 | Kiyoura et al. | 369/44.29 |
| 5,808,974 A | * | 9/1998 | Jamail | 369/32 |
| 5,857,020 A | * | 1/1999 | Peterson et al. | 705/52 |
| 6,091,886 A | * | 7/2000 | Abecassis | 386/52 |

* cited by examiner

*Primary Examiner*—Thai Tran
*Assistant Examiner*—Christopher Onuaku
(74) *Attorney, Agent, or Firm*—Birch, Stewart, Kolasch & Birch, LLP

(57) ABSTRACT

This invention provides an apparatus and method for changing viewing restriction level in a parental control system for reproduction of programs by means of entering into a mode for changing a previously set viewing restriction level, inputting password data, comparing the input password data with preset password data and allowing the viewing restriction level to be changed if both password data are the same, thereby preventing unauthorized changing of the previously allowed restriction level and keeping adolescents or children from viewing programs that exceed the allowed level limit.

18 Claims, 3 Drawing Sheets

APPARATUS AND METHOD FOR CHANGING VIEWING RESTRICTION LEVEL IN A PARENTAL CONTROL SYSTEM FOR DIGITAL VERSATILE DISC PLAYER

FIELD OF THE INVENTION

The invention relates to changing of viewing restriction level in a parental control system in a digital versatile disc player, more particularly relates to an apparatus and method for changing parental control codes for a digital versatile disc (DVD) player in which the player automatically blocks out the changing of the previous viewing restriction level by unauthorized persons.

BACKGROUND OF THE INVENTION

Conventionally, parental control system allows the viewing restriction level to be set in a disc player so that, when programs having various ratings are recorded on the disc, at the initial stage of playback, adolescents or children are kept from viewing programs for adults.

However, if a program which is not suitable for adolescents or children to view is erroneously set as a level or rating version for adolescents or children, since there is no way to change the ratings version, adolescents or children may be exposed to some of the contents of a program which exceed an allowed level limit.

SUMMARY OF THE INVENTION

To overcome the above problem, an object of this invention is to provide an apparatus and a method for changing the viewing restriction level in a parental control system in a digital versatile disc player. The apparatus and method must be capable of preventing unauthorized changing of an allowed viewing restriction level and preventing adolescents or children from viewing some of the contents of a program that exceed the allowed level limit by allowing the viewing restriction level to be changed only by verification of a password data input when the changing of a previously set restriction level for playing programs is requested.

To achieve the above objects, according to an aspect of an apparatus for changing a viewing restriction level in a parental control system in a digital versatile disc player of this invention, the apparatus is provided with a video processing means for processing video signals which include ratings codes detected from a disc; a data input means for inputting a command for entering into a mode for changing a previously set restriction level for the ratings codes output from the video processing means, and for inputting password data and data for changing the previously set restriction level; a memory means for storing preset password data as reference password data; and a contol means for determining whether the mode for changing the viewing restriction level is selected by the command entered from the data input means, for comparing the password data input from the data input means with the preset password data stored in the memory means, and for allowing the viewing restriction level to be changed if both are the same.

According to another aspect of an apparatus for changing a viewing restriction level in a parental control system in a digital versatile disc player of this invention, the apparatus is provided with a video processing means for processing video signals which include ratings codes detected from a disc; a data input means for input of a command for entering into a mode for changing the previously set restriction level for the ratings codes output from the video processing means, and for input of password data and data for changing the previously set restriction level; an on-screen display means for output of a menu display including a menu for changing the viewing restriction level as on-screen video signals when the player enters into the changing mode; a video synthesizer for synthesizing the output video signals of said on-screen display means with the output video signals of the video processing means; a memory means for storing preset password data as reference password data; and a contol means for determining whether the mode for changing the viewing restriction level is selected by said command entered from the data input means, for comparing the password data input from the data input means with the preset password data stored in the memory means if the mode is selected, and making the video synthesizer display said on-screen menu for changing the viewing restriction level as synthesized video output if both password data are the same thereby allowing the viewing restriction level to be changed by the data input means.

According to still another aspect of an apparatus for changing a viewing restriction level in a parental control system in a digital versatile disc player of this invention, the apparatus is provided with a video processing means for processing video signals which include ratings codes detected from a disc; a password data input means for setting a mode for changing a previously set viewing restriction level for the ratings codes output from the video processing means by entry into a mode for input of password data, and for inputting the password data; a data input means for input of data for changing the previously set viewing restriction level; a display means for displaying a menu for changing the viewing restriction level when the digital versatile disc player enters into the mode for changing the previously set viewing restriction level; a memory means for storing preset password data as reference password data; and a contol means for comparing the password data input from the data input means with the preset password data stored in the memory means when the mode for changing the previously set viewing restriction level is entered into, and for allowing the viewing restriction level to be changed by the data input means by making the display means display a menu for changing the viewing restriction level if both password data are the same.

According to further another aspect of an apparatus for changing a viewing restriction level in a parental control system in a digital versatile disc player of this invention, the apparatus is provided with a video processing means for processing video signals which include ratings codes detected from a disc; a password data input means for setting a mode for changing a previously set viewing restriction level for the ratings codes output from the video processing means by entry into a mode for input of a password data, and for inputting the password data; a data input means for input of a data for changing the previously set viewing restriction level; an on-screen display means for output of a menu display including a menu for changing the viewing restriction level as on-screen video signals when the digital versatile disc player enters into the mode; a video synthesizer for synthesizing the output video signals of the on-screen display means with the output video signals of the video processing means; a memory means for storing preset password data as reference password data; and a contol means for comparing the password data input from the data input means with the preset password data stored in the memory means when the mode for changing the viewing restriction level is entered into, and for allowing the viewing restriction level to be changed by the data input means by making the video synthesizer display the on-screen menu for changing the viewing restriction level as the synthesized video output if both password data are the same.

According to an aspect of a method for changing a viewing restriction level in a parental control system in a digital versatile disc player of this invention, the method comprises the steps of setting a mode for changing a previously set viewing restriction level for ratings codes detected from a disc, according to a command for entering into the mode from a first data input means; comparing password data input from a second data input means with preset password data stored in a memory means when the mode for changing the previously allowed viewing restriction level is entered thereby determining whether both password data are the same; and controlling a display means to display a menu for changing the previously set viewing restriction level and the viewing restriction level to be changed by a third data input means on the basis of the displayed menu if both password data are the same.

In the the above aspect of a method of this invention, the first, second, and third data input means may be the same means. Additionally, the first and second data input means may be the same means or the second and third data input means may be the same means. Further, the input of said password data may be performed on the basis of display of a password input menu.

According to another aspect of a method for changing a viewing restriction level in a parental control system in a digital versatile disc player of this invention, the method comprises the steps of setting a mode for changing a previously set viewing restriction level for ratings codes detected from the disc by entering into a mode for input of password data from a first data input means; comparing the password data input from said first data input means with preset password data stored in a memory means thereby determining whether both password data are the same; and controlling a display means to display a menu for changing the previously set viewing restriction level and a second data input means to change the viewing restriction level on the basis of the displayed menu if both password data are the same.

According to still another aspect of a method for changing a viewing restriction level in a parental control system in a digital versatile disc player of this invention, the method comprises the steps of setting a mode for changing a previously set viewing restriction level for ratings codes detected from a disc, according to a command for entering into the mode from a first data input means; comparing password data input from a second data input means with preset password data stored in a memory means thereby determining whether both password data are the same when the mode for changing the previously set viewing restriction level is set; and synthesizing an on-screen menu from an on-screen display means for changing the previously set viewing restriction level with video signals reproduced from the disc if both password data are the same, and displaying the synthesized signals; and changing the viewing restriction level by a third data input means on the basis of the displayed signals.

In the the above aspect of a method of this invention, the first, second, and third data input means may be the same means. Additionally, the first and second data input means may be the same means or the second and third data input means may be the same means. Further, the input of said password data may be performed on the basis of display of a password input menu.

According to further another aspect of a method for changing a viewing restriction level in a parental control system in a digital versatile disc player of this invention, the method comprises the steps of setting a mode for changing a previously set viewing restriction level for ratings codes detected a the disc by input of a password data from a first data input means; comparing the password data input from said first data input means with preset password data stored in a memory means thereby determining whether both password data are the same; and synthesizing an on-screen menu from an on-screen display means for changing the previously set viewing restriction level with video signals reproduced from the disc if both password data are the same, and displaying the synthesized signals; and changing the viewing restriction level by a second data input means on the basis of the displayed signals.

Other and further objects, features and advantages of the invention will appear more fully from the following description.

BRIEF DESCRIPTION OF THE DRAWINGS

A detailed description of this invention will be given with reference to the accompanying drawings.

DESCRIPTION OF THE INVENTION

Figure 1:
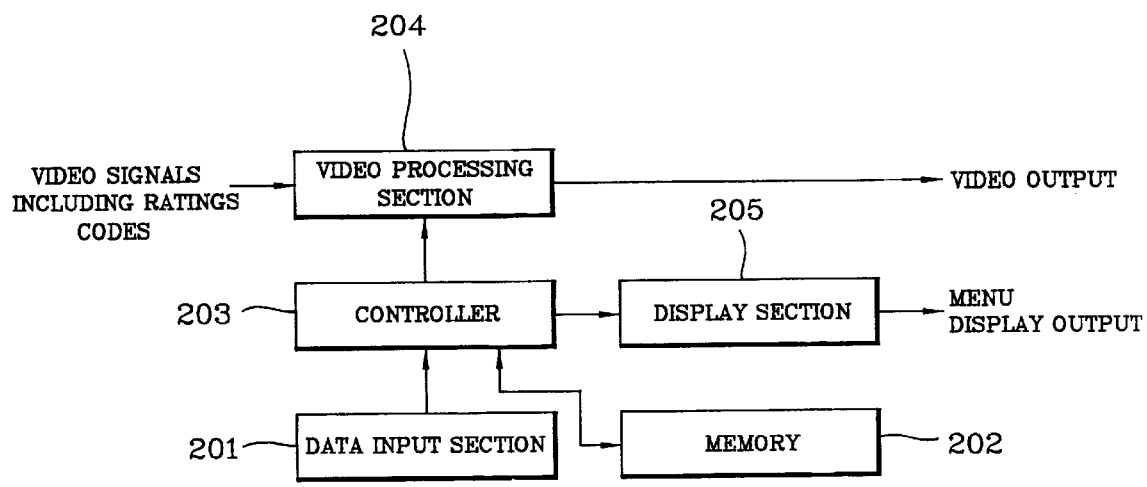
FIG. 1 is a block diagram of an apparatus for changing a viewing restriction level in a parental control system in a digital versatile disc player according to a first embodiment of this invention.

FIG. 1 shows a block diagram of an apparatus for changing a viewing restriction level in a parental control system in a digital versatile disc player according to a first embodiment of this invention. As shown in FIG. 1, the apparatus for changing a viewing restriction level according to the first embodiment of this invention comprises a video processing section 204 for processing video signals which include various rating codes detected from a disc and for corresponding to multiple viewing restriction levels decoding the processed video signals; a display section 205 for displaying a password input menu and/or a viewing restriction level changing menu, etc.; a data input section 201 for setting the viewing restriction level changing mode, for inputting the password data, and for manipulating how the viewing restriction level is changed; a memory 202 for storing preset password data which functions as reference data for allowing the viewing restriction level to be changed; and a controller 203 which is connected to the video processing section 204, the display section 205, the data input section 201 and the memory 203 for controlling them.

Figure 3A:
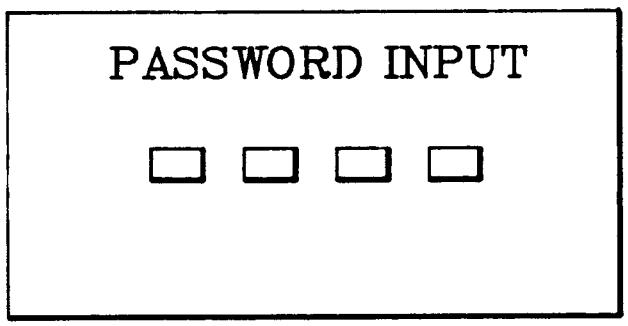
FIGS. 3A and 3B show examples of a password data input menu and a viewing restriction level changing menu which can be used in the embodiments of this invention, respectively.

When playing back to contents of a program recorded on a disc which are classified into levels or ratings version to be viewed, for example PG, PG-13, R or NC-17, it often happens that a user needs to change a viewing restriction level depending on the viewer and the program to be viewed. In such case, if the user enters into the viewing restriction level changing mode by manipulating the data input section 201, the controller 203 controls the display section 205, preferablely an on-screen display device or the front panel of the player to display the password data input menu for determining whether the changing of the viewing restriction level will be allowed. At the time, the display section 205 displays a 4-digit password data input menu exemplified in FIG. 3A. Accordingly, if the user inputs password data by manipulating the data input section 201, the controller 203 compares the input password data with preset password data stored in memory 202 to determine whether both password data are the same.

Figure 3B:
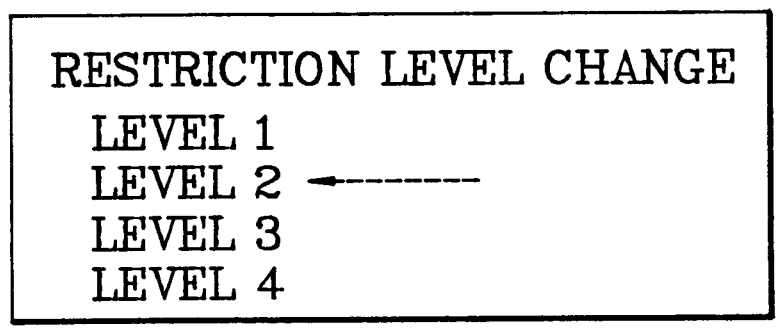

If both password data are the same, the controller 203 controls the display section 205 to display the viewing restriction level changing menu as shown in FIG. 3B. However, if both password data are not the same, an error message which indicates the input password data as being wrong may be displayed. Then, after the input password data is cleared, whether an input terminating signal is input is determined. If it is determined that input terminating signal has been input, all operations can be stopped, or if the input terminating signal is not input within a predetermined time period, the password data input menu can be repeatedly displayed so that more opportunity for inputting correct password data is given to the user.

In the above, where the viewing restriction level changing menu exemplified in FIG. 3B is displayed due to identical password data, the user manipulates the data input section 201 to set a desired level by moving the cursor shown in FIG. 3B to the desired level.

If the controller 203 for determining whether the viewing restriction level is changed determines the restriction level has been changed, the controller 203 controls the servo to change the present viewing restriction level into the selected one of the viewing restriction level. After that, the controller 203 determines whether an input terminating signal has been input; if the input terminating signal has been input, the controller 203 controls the display section 205 to clear the viewing restriction level changing menu displayed on the screen.

Here, if the input terminating signal is not inputted within a predetermined time period after the changing of the previous viewing restriction level, it is possible to correct or change the present viewing restriction level by continuing display of the menu as shown in FIG. 3B, and manipulating the data input section 201 to move the cursor into an desired viewing restriction level.

Figure 2:
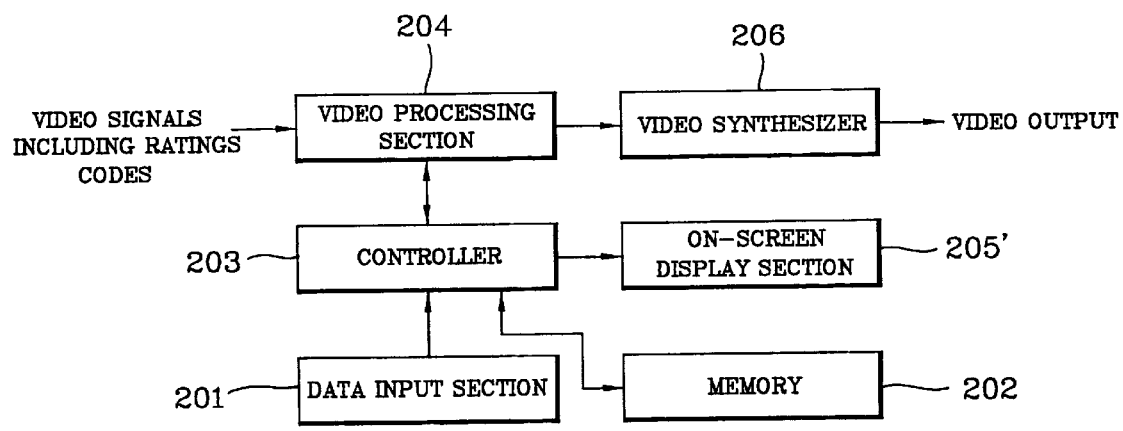
FIG. 2 is a block diagram of an apparatus for changing a viewing restriction level in a parental control system in a digital versatile disc player according to a second embodiment of this invention.

FIG. 2 shows a block diagram of an apparatus for changing a viewing restriction level in a parental control system in a digital versatile disc player according to a second embodiment of this invention. As shown in FIG. 2, the apparatus for changing a viewing restriction level according to the second embodiment of this invention comprises a video processing section 204 for processing video signals which include ratings codes detected from a disc and for decoding the processed video signals; an on-screen display section 205' for displaying a password input menu and/or a viewing restriction level changing menu, etc.; a video synthesizer 206 for synthesizing menu video signals output from the on-screen display section 205' with output video signals of the video processing section 204 and for output of the synthesized video signals; a data input section 201 for setting the viewing restriction level changing mode, for inputting the password data, and for manipulating the viewing restriction level changing; a memory 202 for storing preset password data which functions as reference data for allowing the viewing restriction level to be changed; and a controller 203 which is connected to the video processing section 204, the on-screen display section 205', the data input section 201 and the memory 203 for controlling them.

The apparatus for changing a viewing restriction level in a digital versatile disc player according to the second embodiment is different from the apparatus according to the first embodiment in that since the second embodiment includes a video synthesizer 206, if the on-screen display section 205' outputs the password data input menu and the viewing restriction level changing menu, etc., the video synthesizer 206 synthesizes the menus with the video signals detected from the disc, and decoded in and outputted from the video processing section 204 and outputs the synthesized video signals. Since the operation of the apparatus according to the second embodiment are the same as those of the apparatus according to the first embodiment except for the above, the further description of the second embodiment will be omitted.

In the above first and second embodiments, the data input section 201 for input of a command for entering into a mode for changing the previously set viewing restriction level, and for inputting password data and data for changing the previously set viewing restriction level may be, for example, keys provided to the player or a remote control device.

Also, the data input section 201 in the first and second embodiments may comprise means for inputting a command for entering into a mode for changing the previously set viewing restriction level, and for inputting password data, and means for inputting data for changing the previously set viewing restriction level which is different from said means for inputting the command and the password data. For example, said means for inputting the command and the password data may be a smart card for inputting the command and the password data as codes including the password data, and said means for inputting the data for changing the previously set viewing restriction level may be key means. Here, if the smart card is used as said means for inputting the command and the password data, the entering into the mode for changing the previously set viewing restriction level may be performed by inputting the codes stored on the card, and comparing the codes with the reference signal stored in the memory 202 of the apparatus, and the changing of the viewing restriction level may be performed by inputting the password data stored on the smart card, and comparing the input password data with the preset password data stored in the memory 202.

Further, the data input section 201 in the first and second embodiments may comprise means for inputting the command for entering into a mode for changing the previously set viewing restriction level, and means for inputting said password data and inputting the data for changing the previously set viewing restriction level which is different from said means for inputting the command. For example, said means for inputting the command may be a smart card provided with an encoded portion or an external key locking device, and said means for inputting the password data and the data for changing the previously set viewing restriction level may be key means. Here, if the smart card is used as said means for inputting the command, entering into the mode for changing the previously set viewing restriction level is performed by inputting the codes stored on the card, and comparing the codes with the reference signal stored in the memory 202 of the apparatus. If the key locking device is used as said means for inputting the command, the entering into the mode for changing the previously set viewing restriction level is performed by unlocking the key locking device based on reference signals corresponding to ON/OFF of the key locking device stored in the memory 202 of the apparatus.

Further, in the first and second embodiments, the data input section 201 may comprises means for inputting a command for entering into a mode for changing the previously set viewing restriction level, means for inputting password data, and means for inputting the data for changing the previously set viewing restriction level which are different from each other.

Figure 4:
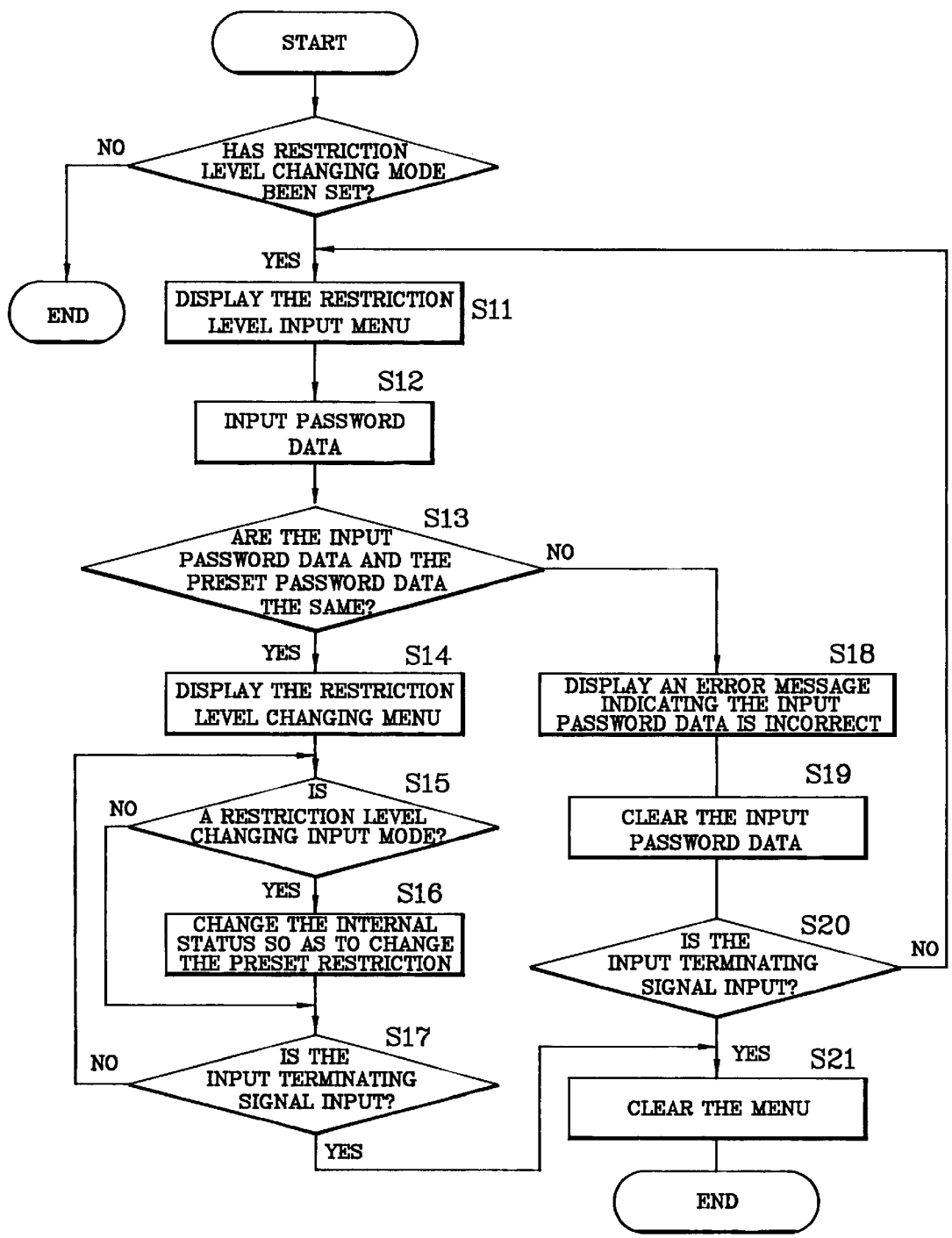
FIG. 4 is an illustrative flow chart of control of changing a viewing restriction level according to this invention.

FIG. 4 shows an illustrative flow chart of control of changing a viewing restriction level in a parental control system according to this invention.

First, it is determined at step S10 whether the viewing restriction level changing mode has been set. If the mode has been set, a password data input menu for inputting password data is displayed at step S11, and then the password data is input at step S12. If the password data is input at step 12, it is determined at step S13 whether the password data and preset password data are the same. If both password data are the same, a viewing restriction level changing mode is displayed at step S14. Then, it is determined at step S15 whether viewing restriction level changing input has been input within a predetermined time period.

At this time, if the viewing restriction level changing input has been input within a predetermined time period, the control flow goes to step S16 an internal status is changed so as to change the preset viewing restriction level at step S16. And then it is determined at step S17 whether an input terminating signal has been input. If the viewing restriction level changing input has not been input within the predetermined time period at step S15, the control flow goes directly to step S17, and then it is determined at step S17 whether the input terminating signal has been input. If the input terminating signal has been input within the predetermined time period at step S17, the viewing restriction level changing menu is cleared at step S21 and the operation of the viewing restriction level changing mode is ended. If the input terminating signal has not been input at step S17 within the predetermined time period, the control flow returns to step S15, and then the viewing restriction level changing input can be retried.

If the input password data and the preset or reference password data is not the same at step S13, it is possible to display that the input password data is incorrect at step S18. Then, the input password data is cleared at step S19, and it is judged at step 20 whether the input terminating signal has been input. If it is determined that the input terminating signal has been input, the viewing restriction level changing menu is cleared at step S21 and the operation of the viewing restriction level changing mode is ended. If the input terminating signal is not input within the predetermined time period at step S20, the control flow returns to step S11, and then the password data input menu is once again displayed so as to retry to input the password.

For example, in the case that a card storing the password code therein is used, since the inputting of the password data can be made by a card reader, it is obvious to a person having ordinary skill in the art to which the invention pertains that the password input menu of step S11 in the flowchart shown in FIG.4 may not be required.

The above description has been given with reference to the first and second embodiments according to this invention having a viewing restriction level changing mode as a separate step, but if entering into the viewing restriction level changing mode is performed by starting the input of the password data, the judging of consistency of the input password data and the preset password data stored in the memory 202 can be carried out without the viewing restriction level changing mode as a separate step.

The changing of the viewing restriction level may be performed by, if a smart card is used, reading out the password data stored in the card and comparing the read out password data with the preset password data stored in the memory, or if a key locking device is used, comparing signal corresponding to OFF of the key locking device with the preset password data stored in the memory.

As described above, this invention is provided with a password input step, and hence the changing of the viewing restriction level can be made by an authorized user, but is unavailable to unauthorized users.

Further, if a viewing restriction level is preset, and playback of a disc starts, all of levels including the preset level within an area to be played back are detected on playback and recording portions having higher levels than the preset level are skipped so as to prevent them from being played back.

As described above, if program having various viewing restriction level is recorded on a disc, a parent or authorized person can keep adolescents or children from viewing some of the contents of the program that exceed the allowed level limit by changing the viewing restriction level.

As will be evident to those skilled in the art, various modifications of this invention can be made or followed in light of the foregoing disclosure without departing from the spirit of the disclosure or from the scope of the claims.

What is claimed is:

1. An apparatus for displaying a menu for changing a viewing restriction level of a program in a parental control system for a digital disc player, the apparatus comprising:

a video processor receiving and processing video signals including said program recorded on a disc, and thereby generating output video signals, wherein said program contains various rating codes recorded on said disc;

a data input device inputting password data and input data to change a previously set viewing restriction level;

an on-screen display section generating a menu to be displayed for at least one of identifying said input password data from said data input device with a preset password data and changing the previously set viewing restriction level; and a video synthesizer synthesizing the menu generated from said on-screen display section with the output video signals of said video processor and thereby displaying a program synthesized with the menu.

2. The apparatus according to claim 1, wherein said data input device is comprised of keys provided in said disc player.

3. The apparatus according to claim 1, wherein said data input device is a remote control device.

4. The apparatus according to claim 1, wherein said data input device comprises:

a first input device inputting a command for entering into a mode for changing the previously set viewing restriction level for the ratings codes output from said video processor, and inputting the input password data, and a second input device inputting the data for changing the previous set viewing restriction level.

5. An apparatus for changing viewing restriction level in a parental control system for a digital versatile disc player according to claim 4, wherein said first input device is a card provided with an encoded portion, and said second input device is comprised of a plurality of keys.

6. The apparatus according to claim 1, wherein the video synthesizer displays the program synthesized with the menu, so that the menu and the program are simultaneously displayed on a single display device.

7. The apparatus according to claim 1, further comprising:
a controller determining whether a change mode is selected by a command entered to said data input device, comparing said input password data with the preset password data if the change mode is selected, and controlling the video synthesizer to display said synthesized menu based on said comparison results, thereby allowing a change of the viewing restriction level while said program is playing back, not for editing purposes, on a display device.

8. A method for displaying a menu for changing a viewing restriction level of a program in a parental control system for a digital disc player, the method comprising:
processing video signals including said program recorded on a disc and thereby generating output video signals, wherein said program contains various rating codes recorded on said disc;
inputting password data and input data for changing a previously set viewing restriction level;
generating an on-screen display menu for at least one of identifying said input password data inputted in said inputting step with a preset password data and changing the previously set viewing restriction level; and
synthesizing the menu from said generating step with the output video signals from said processing step and thereby displaying a program synthesized with the menu.

9. The method according to claim 8, wherein said program synthesized with said menu is displayed, so that the menu and the program are simultaneously displayed on a single display device.

10. The method according to claim 8, further comprising:
determining whether a change mode is selected by a command inputted in said inputting step;
comparing said input password data with the preset password data if the change mode is selected; and
displaying said synthesized menu based on said comparison results, thereby allowing a change of the viewing restriction level while said program is playing back, not for editing purposes, on a display device.

11. A method of changing a viewing restriction level of a program recorded on a disc, the method comprising:
performing a playback of said program based on a first viewing restriction level, wherein said program contains various rating codes recorded on said disc;
receiving, during said playback of said program, a request to modify the first viewing restriction level;
verifying the request using password information, wherein the password information is input to a menu being displayed simultaneously with said program during said playback of said program;
applying a second viewing restriction level based on the verification; and
continuing said playback of said program based on the second viewing restriction level.

12. The method according to claim 11, further comprising:
displaying a menu for receiving the request to modify the first viewing restriction level while the program is being played back.

13. The method according to claim 12, wherein, in the displaying step, the menu and the program are displayed simultaneously on a single display device.

14. The method according to claim 11, further comprising:
determining whether a change mode is selected;
comparing input password data with preset password data if the change mode is selected; and
displaying said menu with said program based on said comparison results, thereby allowing a change of the viewing restriction level while said program is playing back, not for editing purposes, on a display device.

15. An apparatus for changing a viewing restriction level of a program recorded on a disc, the apparatus comprising:
a video processor to perform a playback of said program recorded on said disc based on a first viewing restriction level, wherein said program contains various rating codes recorded on said disc;
an user interface to receive, during said playback of said program, a request to modify the first viewing restriction level; and
a controller to verily the request using password information, wherein the password information is input to a menu being displayed simultaneously with said program during said playback of said program, said controller configured to apply a second viewing restriction level based on the verification, and to control the video processor so that said playback of said program is continued based on the second viewing restriction level.

16. The apparatus of claim 15, further comprising:
a display to indicate the request to modify the first viewing restriction level from the user interface; and
a video synthesizer to synthesize the indication of the request in accordance with the video processor operation.

17. The apparatus according to claim 15, further comprising:
a video synthesizer to synthesize said program reproduced from said disc by the video processor with said menu for receiving the request to modify the first viewing restriction level, so as to display simultaneously the program and the menu on a single display device.

18. The apparatus according to claim 15, wherein the controller determines whether a change mode is selected, compares input password data with preset password data if the change mode is selected, and controls displaying of said menu with said program based on said comparison results, thereby allowing a change of the viewing restriction level while said program is playing back, not for editing purposes, on a display device.

* * * * *